(No Model.)
H. RENOLD, W. T. GOOLDEN, L. B. ATKINSON
& S. C. G. GOLD.
CUTTER OR DRILL APPLICABLE TO COAL, &c.
No. 481,656. Patented Aug. 30, 1892.
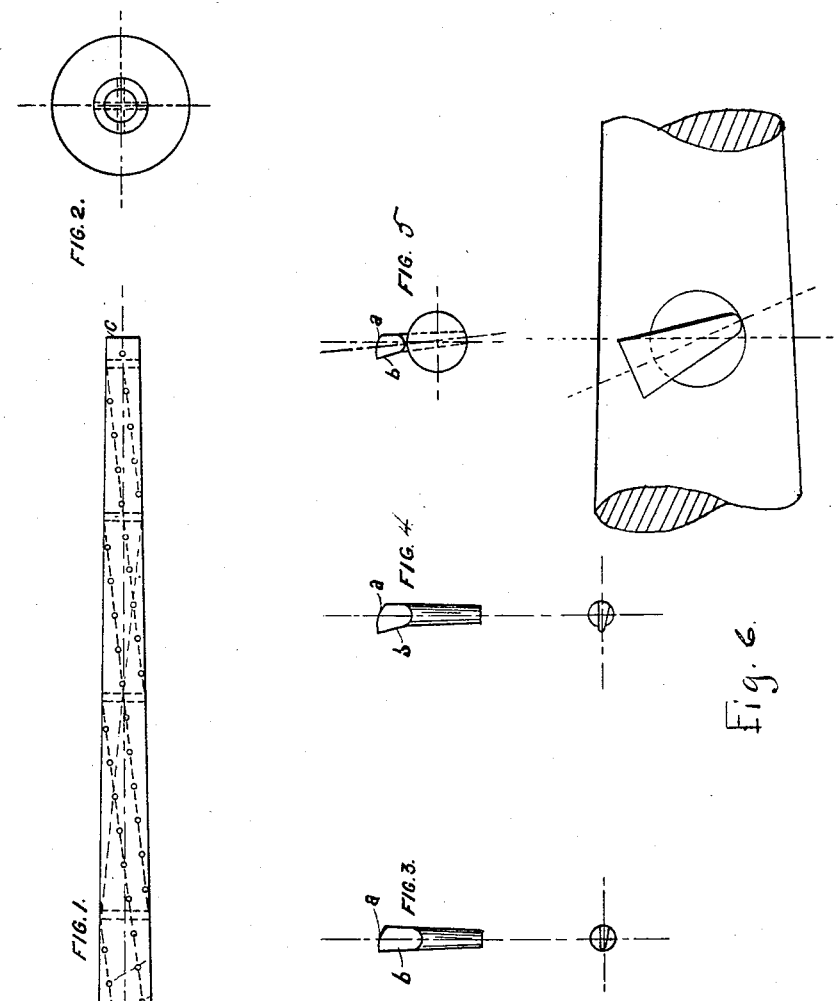
Witnesses:
E. B. Bolton
M. Clifford
Inventors:
Hans Renold
Walter Thomas Goolden
Llewelyn Birchall Atkinson
Sidney Charles Gilbey Gold
By Richards & Co.
their Attorneys.

UNITED STATES PATENT OFFICE.

HANS RENOLD, OF MANCHESTER, AND WALTER T. GOOLDEN, LLEWELYN B. ATKINSON, AND SYDNEY C. G. GOLD, OF LONDON, ENGLAND.

CUTTER OR DRILL APPLICABLE TO COAL, &c.

SPECIFICATION forming part of Letters Patent No. 481,656, dated August 30, 1892.

Application filed September 5, 1891. Serial No. 404,873. (No model.) Patented in England August 24, 1889, No. 13,369.

*To all whom it may concern:*

Be it known that we, HANS RENOLD, residing at Manchester, and WALTER THOMAS GOOLDEN, LLEWELYN BIRCHALL ATKINSON, and SYDNEY CHARLES GILBEY GOLD, residing at London, England, have invented Improvements in Cutters or Drills Applicable to Coal or other Materials, (which has been patented to us in Great Britain under No. 13,369 and dated August 24, 1889,) of which the following is a specification.

This invention relates to improvements in cutters or drills applicable to coal or other materials, and has for its object the formation of a cutter or drill, enabling the best shape or configuration and the most suitable material to be used for each part.

In such cutters or drills as heretofore made the cutting-edge and the supporting-bar have either been made in one piece, necessitating the use of material unsuitable for both, or the cutters have been formed separately and attached by screws, wedges, or dovetails to the bar, causing the same to be complicated and expensive and of shapes inefficient to the purpose in view. In the improved construction the bar or cutter-shaft is composed of mild steel or iron of great tenacity and toughness, either straight or tapering or any other form. The cutter-teeth are formed of separate pieces of steel, which are made of a special temper or hardness best suited for the material to be cut. The cutter-shaft has a series of taper holes drilled in it, the taper being between 1 in 20 and 1 in 30, and into these holes the cutters are driven and held fast by friction alone. The action of the cutter when working has a tendency to drive the cutter-teeth tighter into their holes, especially when their axes are so arranged as not to pass through the center of the bar, but tangentially. The distribution of the cutter-teeth over the bar is such that each follows its fellow at a distance of more or less than one-quarter of a revolution or other fraction of a revolution, so that there is not more than one cutter-tooth at a time in a line drawn on the bar in a plane containing the axis, which has the effect of distributing the cutting strains all over the circumference, as well as in the whole length of the cutter-bar. In other words, should the cutter meet with any hard obstacle not more than one or at most two teeth will strike it at a time. This arrangement of cutters gives them a corkscrew or spiral form, which has a tendency to draw out the cuttings as the bar revolves, especially as the front or side surfaces of the cutters are shaped and set in their holes so as to be partly inclined to the plane of revolution, and thus help to push out the cuttings toward the flange end of the bar, and thus somewhat liberate the cutter. The form of cutter-point varies with the material to be cut, but it is so arranged as to be ground on the end face to maintain a constant cutting-angle and to have sufficient metal backing the cutting-edge to give the requisite strength and to carry off the heat developed. When the cutting-teeth are used up by constant grinding, they can easily and at very little cost be replaced by new ones, forming with the old cutter-bar practicably a new cutter again.

In order that our invention may be the better understood, we now proceed to describe the same in relation to the drawings hereunto annexed, reference being had to the letters marked thereon.

Like letters refer to like parts throughout the drawings.

Figure 1 is an outside elevation of my cutter-bar provided with taper holes for cutters. Fig. 2 is an end view of the same. Figs. 3 and 4 are details of the cutters with taper shanks. Fig. 5 is an end view of bar with a cutter in place. Fig. 6 shows a cutter in position upon the bar.

The cutters are provided with a flange $d$ for coupling them to a cutting or drilling machine. It is provided with a series of taper holes distributed along its length at short intervals along lines representing left-hand spirals or threads with a pitch of the length of the bar, about four threads being used. The relative positions of the holes are so placed that each successive cutter taken circumferentially is placed a little in advance of the cutter of the adjacent thread—that is, on the intersections of a right-hand spiral pitch-line of short pitch with the said left-handed long pitch spiral pitch-line—so that there is never more than one cutter in a circumferential ring about the cutter-bar. The taper-holes through the bar do not, therefore, foul each other and the cutters taken as nearly circumferentially as possible across their left-handed pitch-line settings form a right-handed thread which materially aids self-delivery of cuttings.

The cutters shown at Fig. 3 are sharpened by being ground at the end faces $a$; but other forms may be used which can be ground on the front faces $b$.

Fig. 4 shows the arrangement of the cutter where the axis of the cutter does not pass through the bar, but tangentially to a surface inside the bar, thus giving the cutter greater tendency to be driven in by the cutting action.

A cutter or cutters may, if necessary, be driven in the end C in Fig. 1 either centrally or at an angle to the axis.

Having now particularly described and ascertained the nature of our said invention and in what manner the same is to be performed, we declare that what we claim is—

In a cutter-bar or drill, the combination, with a plain cylindrical bar provided with a flange for attachment to the cutting or drilling machine, of a series of taper holes drilled tangentially to a small circle about the axis and cutters with taper shanks frictionally held therewith, cutting faces slightly inclined to the plane of revolution, the said holes arranged at equal distances upon the intersection of each pair of pitch-lines, one left-handed with a pitch about once the length of the bar and one right-handed of short pitch about one-tenth the length of the bar, the cutters being thus adapted both to feed out the cuttings by the right-hand spiral setting and also by the left-hand spiral setting to engage only successively in any stratum parallel to the axis of the bar.

In testimony whereof we have signed our names to this specification in the presence of two subscribing witnesses.

HANS RENOLD.
  WALTER T. GOOLDEN.
  LLEWELYN B. ATKINSON.
  SYDNEY C. G. GOLD.

Witnesses as to Hans Renold:
 ARTHUR C. HALL,
 ARTHUR H. POPE,
  9 *Mount St., Manchester*.
Witnesses as to Walter T. Goolden and Llewelyn B. Atkinson:
 TOM. M. TULEY,
 CHARLES F. ARROWSMITH.
Witnesses as to Sydney C. G. Gold:
 JOHN C. FELL,
 RICHARD A. HOFFMANN.